(12) United States Patent
Becher et al.

(10) Patent No.: US 7,114,766 B2
(45) Date of Patent: Oct. 3, 2006

(54) WINDOW BLIND FOR A SLIDING ROOF SYSTEM

(75) Inventors: Thomas Becher, Rodgau (DE); Horst Boehm, Frankfurt am Main (DE); Rainer Grimm, Frankfurt am Main (DE); Christian Biewer, Altheim (DE)

(73) Assignee: ArvinMeritor GmbH, (DE)

( * ) Notice: Subject to any disclaimer, the term of this patent is extended or adjusted under 35 U.S.C. 154(b) by 36 days.

(21) Appl. No.: 10/973,080

(22) Filed: Oct. 25, 2004

(65) Prior Publication Data

US 2005/0225122 A1    Oct. 13, 2005

(30) Foreign Application Priority Data

Apr. 8, 2004    (DE) .................... 10 2004 017 459

(51) Int. Cl.
*B60J 1/20*    (2006.01)

(52) U.S. Cl. ..................................... 296/214; 296/141
(58) Field of Classification Search ................ 296/214, 296/141
See application file for complete search history.

(56) References Cited

U.S. PATENT DOCUMENTS

| | | | | | |
|---|---|---|---|---|---|
| 4,707,018 | A | * | 11/1987 | Gavagan | 296/152 |
| 4,825,921 | A | * | 5/1989 | Rigter | 160/23.1 |
| 6,047,762 | A | * | 4/2000 | Anderson | 160/370.22 |
| 6,309,076 | B1 | * | 10/2001 | McVicker | 359/601 |
| 2004/0075304 | A1 | * | 4/2004 | Cocaign | 296/214 |

* cited by examiner

*Primary Examiner*—Dennis H. Pedder
(74) *Attorney, Agent, or Firm*—Carlson, Gaskey & Olds

(57) ABSTRACT

The invention relates to a window blind for a sliding roof system includes a flexible material and two flat spiral springs that extend along the longitudinal edges of the window blind. The flat spiral springs tend to contract into a spiral shape, winding the flexible material into a coil.

17 Claims, 3 Drawing Sheets

WINDOW BLIND FOR A SLIDING ROOF SYSTEM

REFERENCE TO RELATED APPLICATIONS

The present invention claims the benefit of German Patent Application No. 102004017459.8, filed Apr. 8, 2004.

TECHNICAL FIELD

The invention relates to a window blind for a sliding roof system.

BACKGROUND OF THE INVENTION

A window blind for a sliding roof system may be attached underneath an opening in a vehicle roof to cover an opening in the vehicle roof to a greater or lesser extent according to the choice of the vehicle occupants. If the opening is to be exposed, the window blind is wound up on a winding shaft, which is biased by a spring in the wind-up direction of the shaft. The window blind can therefore be uncoiled against the biasing force of the spring to cover the opening. When the window blind lies underneath the opening in the vehicle roof, the window blind is prevented from sagging into the vehicle interior space by a guide rail on either side of the longitudinal edges of the window blind. Each guide rail receives a longitudinal edge of the window blind and holds the edge taut transverse to the shifting direction of the window blind.

One disadvantage of currently known window blinds is that the spring acting on the winding shaft must be sufficiently strong to be able to wind up the window blind reliably. At the same time, however, the biasing force of the spring must not displace the window blind after it is shifted to a desired position by the vehicle occupant. Due to the aging of the spring, the varying friction-related conditions that can occur during the lifespan of the window blind, and the various spring forces that act with the window blind being fully uncoiled from the winding shaft on the one hand and that act with the window blind being almost completely wound up on the winding shaft on the other hand, the numerous demands on the window blind system can be met only at large manufacturing expense.

There is a desire for a window blind that can be reliably wound up while still securely remaining in any given position set by the vehicle occupant without great expense. There is also a desire for a window blind that occupies a small installation space.

SUMMARY OF THE INVENTION

The invention is directed to a window blind having a flexible material and at least one flat spiral spring that extends along at least one of the longitudinal edges of the window blind. The flat spiral spring tends to contract into a spiral. The flat spiral spring acts directly on the window blind itself instead of on a winding shaft. As a result, the part of the window blind that is not disposed in the guide rails will automatically roll into a coil. Thus, a very low tensile force acts on the portion of the window blind that is located in the guide rails.

The pretensioning of the flat spiral spring causes the springs to develop a comparably high frictional force within the guide rail. This prevents the window blind from undesirably displacing on its own, eliminating the need to include a separate window blind brake to hold the window blind in a selected position.

The invention also relates to an assembly comprising a window blind that has one flat spiral spring on each of its longitudinal edges and two guide rails, each of which receive one flat spiral spring. The flat spiral springs ensure that the window blind is guided between the guide rails. The portions of the flat spiral springs lying outside of the guide rails winds via its own biasing force into a coil shape, thereby winding the window blind attached to those portions.

BRIEF DESCRIPTION OF THE DRAWINGS

The invention will now be explained with the aid of a preferred embodiment illustrated in the attached drawings in which.

DETAILED DESCRIPTION OF THE PREFERRED EMBODIMENT

Generally, a window blind according to the present invention includes a flexible material and two flat spiral springs that extend along the longitudinal edges of the window blind. The flat spiral springs tend to contract into a spiral and act directly on the window blind itself instead of on a winding shaft. This ensures that the portions of the window blind that are not located in the guide rails will automatically be rolled into a coil. Thus, a very low tensile force acts on the portions of the window blind located in the guide rails. Moreover, the pretensioning of the flat spiral springs causes the springs to develop a comparably high friction within the guide rails, reliably preventing the window blind from displacing on its own and eliminating the need to include a separate window blind brake to hold the window blind in a desired position.

The flat spiral springs also allows the window blind to occupy a smaller installation space because spring biasing the winding shaft is not necessary. In fact, the invention allows the winding shaft to be eliminated entirely because the flat spiral springs allow the window blind to wind up freely as soon as the window blind is free from the guide rails.

In one embodiment, the flat spiral springs bias the window blind and at the same time guide the window blind in the guide rail. In this way, elements that would otherwise used to guide the window blind, for instance clip profiles, beaded rims or guide ledges, may be eliminated in the inventive system.

According to one embodiment, the two flat spiral springs are prestressed so that when they lie outside of the guide rails without any window blind attached to and between the springs, they each contract into a spiral, with the points of the spirals facing away from each other. This ensures that the window blind coil originating from the flat spiral springs is held taut transverse to the guide rails, allowing a winding shaft to be eliminated.

The invention is also directed to an assembly unit comprising a window blind, a flat spiral spring disposed on each of the longitudinal edges of the window blind, and two guide rails that each receive one flat spiral spring so that the window blind is guided between the guide rails. The portions of the flat spiral springs that lie outside of the guide rails wind up from their own biasing forces into a coil, also winding the window blind attached to the springs.

Figure 1:
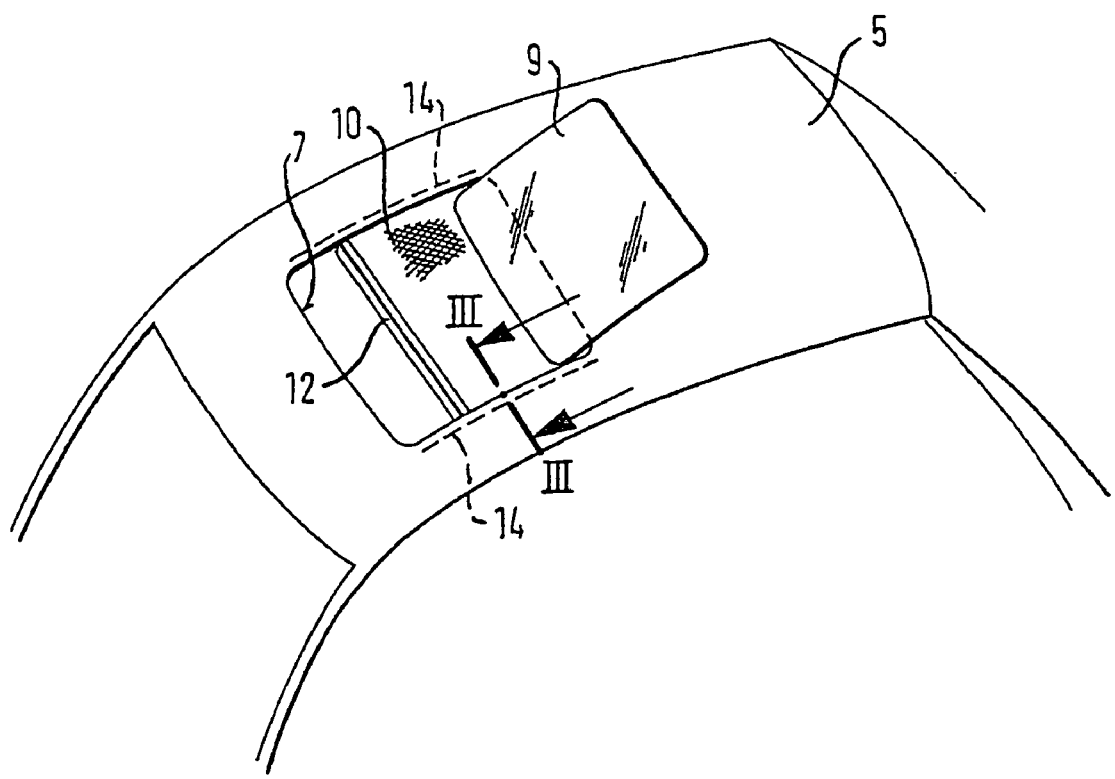
FIG. 1 is a perspective view of a vehicle roof comprising a window blind according to one embodiment of the invention.
Figure 2:
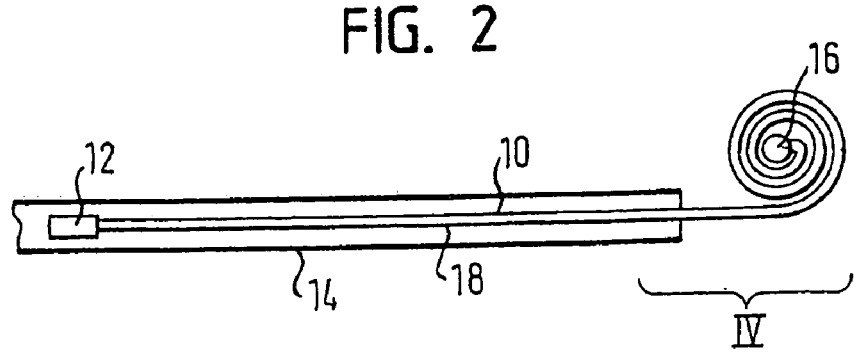
FIG. 2 is a schematic side view of a window blind according to one embodiment of the invention.

Referring to the Figures, FIG. 1 illustrates a vehicle roof 5 having an opening 7. A cover 9 of a sliding roof system is associated with the opening 7 to open and close the opening 7. The cover 9 can be shifted between a closed position where it closes the opening 7 and an open position shown in FIG. 1. A window blind 10 is arranged underneath the cover 9 and also underneath the opening 7. The window blind 10 can be moved forward and backward toward the front and the rear, respectively of the vehicle. If the window blind 10 is pushed completely toward the rear of the vehicle, the opening 7 will be entirely exposed. Fresh air and sunlight can then enter the vehicle interior space freely. If the window blind 10 is pushed completely toward the front of the vehicle, the opening 7 is covered by the window blind, limiting the entry of fresh air and sunlight into the vehicle interior space.

The window blind 10 can be made from any flexible material, such as cloth or plastic film. A handle 12 is disposed on the front edge of the window blind 10, which can be gripped by a vehicle occupant in order to displace the window blind 10 toward the front or the rear of the vehicle. Two guide rails 14 extend laterally along the opening 7 and receive the two longitudinal edges of the window blind 10 (i.e., the right and left edges of the window blind 10 as viewed in the longitudinal direction of the vehicle). At the rear end of the opening 7, a winding body 16 is attached to the rear edge of the window blind 10. In one example, the winding body 16 is not supported on the vehicle roof and can be configured as a plastic ledge that is applied on the rear edge of the window blind 10 by injection-molding. The winding body 16 holds the rear edge of the window blind 10 taut in a direction transverse to the longitudinal direction of the vehicle.

Figure 3:
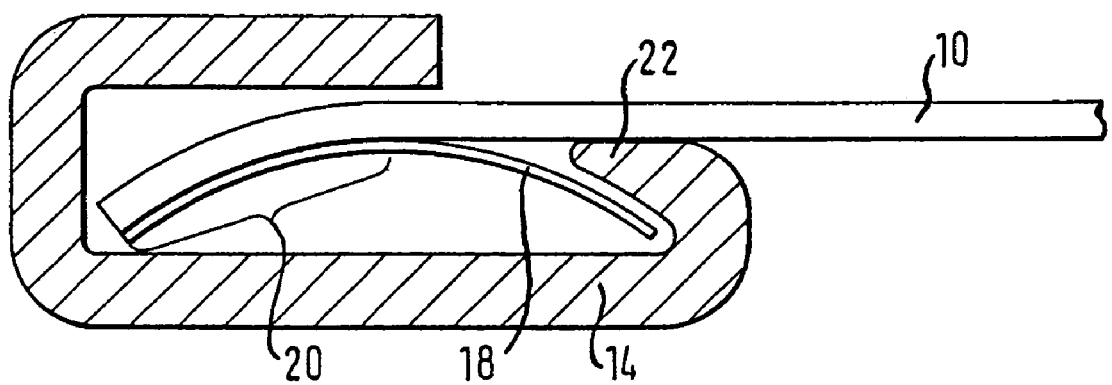
FIG. 3 shows a section along plane III—III of FIG. 1.

A flat spiral spring 18 is associated along each longitudinal edge of the window blind 10 (i.e., in the area associated with the guide rails 14). The flat spiral spring 18 is configured as a thin metal strip made of resilient steel and serves as a guide element for the window blind 10. When the flat spiral spring 18 is received in a corresponding guide rail 14, the flat spiral spring 18 has a curved cross-sectional shape as shown in FIG. 3. The window blind 10 is connected with the flat spiral springs 18 only on an outer portion of each flat spiral spring 18, namely from the outer edge to approximately the vertex of the flat spiral spring 18. This outer half area is denoted by reference numeral 20 in FIG. 3. In one example, the window blind 10 can be glued to the flat spiral spring 18.

As seen in the section view of FIG. 3, the guide rail 14 has a generally rectangular cross-section and has an interior space that accommodates the flat spiral spring 18 together with the edge portion of the window blind 10 attached to the flat spiral spring 18. On a side of the guide rail 14 oriented toward the center of the vehicle, the guide rail 14 has a leg 22 extending between the window blind 10 and the portion of the flat spiral spring 18 extending toward the center of the vehicle (i.e., the area in which the window blind 10 is not glued to the flat spiral spring 18). As a result, the flat spiral spring 18 is supported underneath the leg 22 of the guide rail 14 to hold the window blind 10 taut in the transverse direction.

Figure 5:
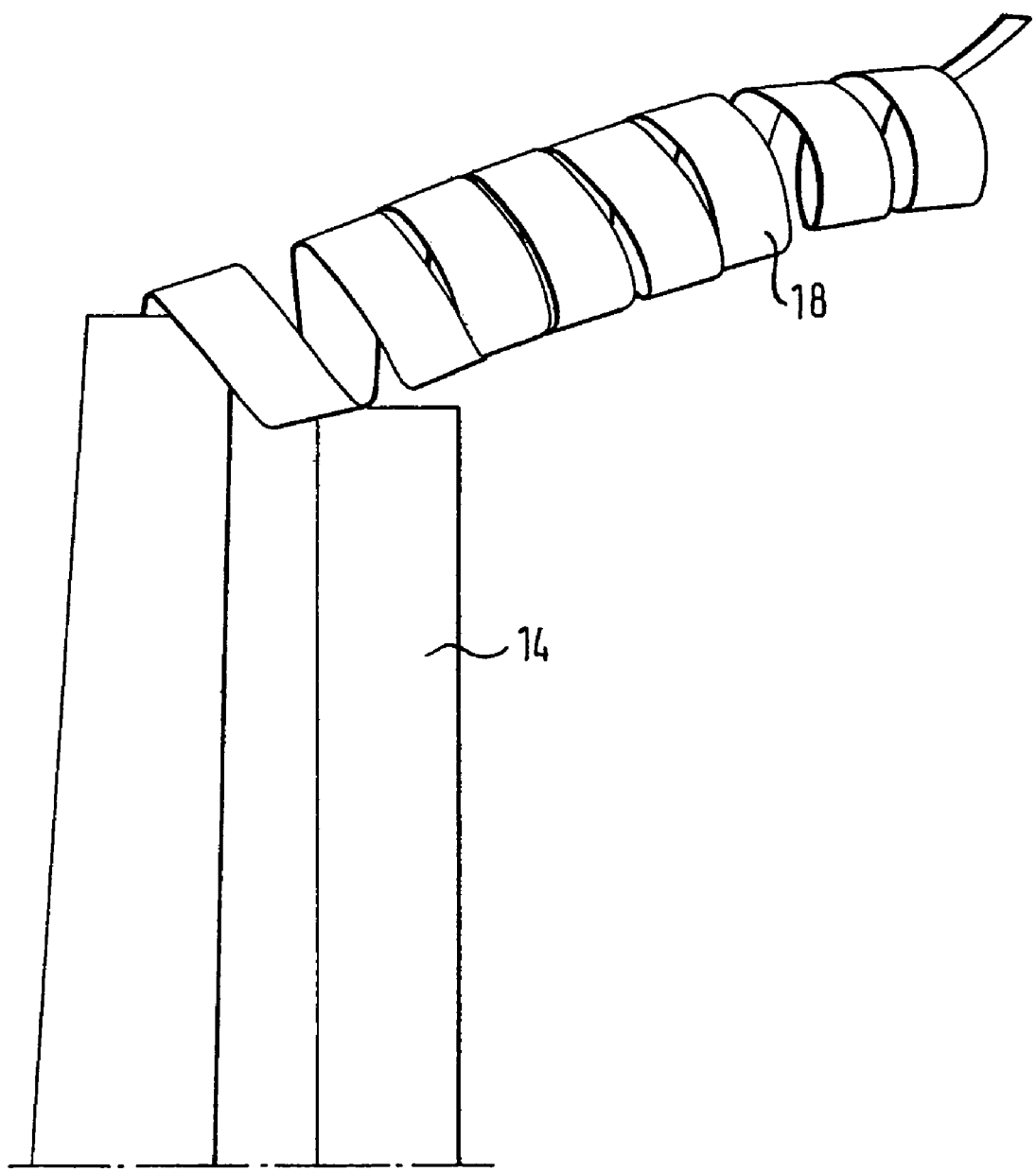
FIG. 5 shows in a schematic view a flat spiral spring in a state where no external forces are acting upon it.

The two flat spiral springs 18 are prestressed so that they automatically roll up when there is no force opposing the biasing force of the flat spiral springs 18. In one example, they are prestressed so that they tend to roll up obliquely as shown in FIG. 5. If the flat spiral spring 18 were allowed to roll up freely without the presence of the window blind 10 and the winding body 16, each flat spiral spring 18 would roll up in such a manner that it would form a spiral whose free end points to the outside of the vehicle (i.e., away from the other flat spiral spring 18). This orientation ensures that the window blind 10 is held taut between the two flat spiral springs 18 when the flat spiral springs 18 are located outside the guide rails 14.

If the window blind 10 is pushed toward the rear in order to expose the opening 7, the rear portion of the window blind 10 will be pushed out of the guide rails 14. In the process, the window blind 10 will roll up into a coil around the winding body 16 on its own due to the biasing force of the flat spiral springs 18 acting on the window blind 10. The resulting window blind coil is held taut due to the pretensioning of the flat spiral springs 18 and the winding body 16. In one example, the window blind coil rests against a wall 24, which delimits an accommodation space for the wound-up window blind 10.

Because there is no spring that exerts a wind-up force on the window blind 10 as a function of the position of the window blind 10, there will be a more constant tensile force counteracting a displacement of the window blind 10 toward the front. A further result is an increase in the shifting force, which creates a self-locking effect on the window blind 10. Thus, actuation of the window blind 10 by hand will cause the window blind 10 to remain in any intermediate position without requiring an additional window blind brake.

Figure 4:
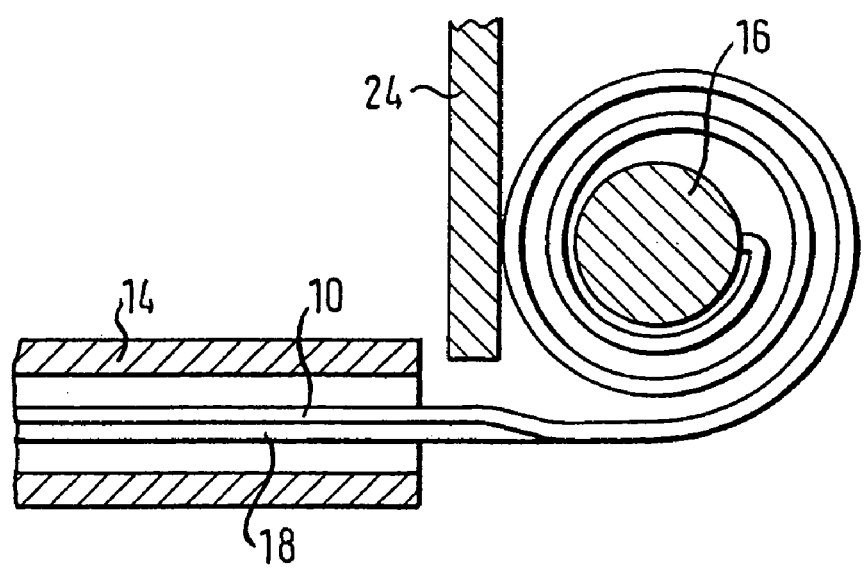
FIG. 4 shows on an enlarged scale detail IV of FIG. 2.

When the window blind 10 extends out from the guide rails 14 and winds up into a coil, the flat spiral springs 18 change their cross-sectional shape from the first cross-sectional shape shown in FIG. 3 to a second cross-sectional shape shown in FIG. 4. The flat spiral springs 18 each have a flat and rectangular cross-section whose height corresponds to the thickness of the material of the flat spiral springs 18. As a result, the coil produced by the flat spiral springs 18 has a small diameter.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A window blind for a sliding roof system, comprising:
   a flexible material having two longitudinal edges; and
   at least one spring strip extending along at least one of the two longitudinal edges and having a biasing force tending to contract the spring strip into a spiral, wherein the at least one spring strip has an inboard edge and an outboard edge, the flexible material being attached only from the outboard edge to a vertex of the at least one spring strip such that the inboard edge is spaced from the flexible material.

2. The window blind according to claim 1, wherein the spring strip is substantially rigid to guide the at least one of the two longitudinal edges in a guide rail.

3. The window blind according to claim 1, wherein the at least one spring strip comprises two spring strips, wherein the two spring strips are prestressed such that free ends of the two spring strips each contract into a spiral, and wherein the free ends face away from each other when the free ends are free from the flexible material.

4. The window blind according to claim 1, wherein the spring strip has a curved cross section.

5. A vehicle roof blind assembly, comprising:
two guide rails;
a flexible material having two longitudinal edges; and
two spring strips, each spring strip received in one of the two guide rails and fixed along one of the two longitudinal edges, with each spring strip having an inboard edge and an outboard edge wherein the flexible material is only attached from the outboard edge to a vertex of each spring strip such that each inboard edge is spaced from the flexible material, and
wherein each spring strip has a biasing force tending to contract the spring strip into a spiral such that each spring strip winds a portion of a window blind extending outside of the two guide rails into a coil.

6. The vehicle roof blind assembly according to claim 5, wherein each spring strip is substantially rigid to guide each longitudinal edge in one of the two guide rails.

7. The vehicle roof blind assembly according to claim 5, wherein each spring strip is prestressed such that a free end of each spring strip contracts to form a spiral, and wherein the free ends face away from each other when the free ends are free from the flexible material.

8. The vehicle roof blind assembly according to claim 5, wherein each spring strip has a curved cross section.

9. The vehicle roof blind assembly according to claim 5, further comprising a wall delimiting an accommodation space for the window blind.

10. The window blind according to claim 1 wherein the at least one spring strip has a curved cross-section defining the vertex between the inboard and outboard edges, and wherein an attachment interface between the at least one spring strip and the flexible material extends from the outboard edge to the vertex such that there is continuous direct contact between the at least one spring strip and the flexible material from the outboard edge to the vertex.

11. The window blind according to claim 1 wherein the inboard edge faces toward a vehicle center and the outboard edge is laterally spaced from the inboard edge in a direction away from the vehicle center.

12. The window blind according to claim 1 wherein the at least one spring strip is received within a guide rail mountable to a vehicle roof, the guide rail including a leg that extends into a space formed between the flexible material and the inboard edge of the at least one spring strip.

13. The vehicle roof blind assembly according to claim 5 wherein each spring strip has a curved cross-section defining the vertex between the inboard and outboard edges, and wherein an attachment interface between each spring strip and the flexible material extends from a respective one of the outboard edges to the vertex.

14. The vehicle roof blind assembly according to claim 5 wherein each of the two guide rails has an inboard rail portion and an outboard rail portion that define an interior cavity that receives one of the two spring strips, and wherein each guide rail includes a leg that extends from the inboard rail portion toward the outboard rail portion, the leg extending into a space formed between the flexible material and the inboard edge of the one of the two spring strips.

15. A vehicle roof blind assembly for a sliding roof system, comprising:
a blind selectively moveable to cover a roof opening, the blind being formed from a flexible material having two longitudinal edges;
at least one spring strip extending along at least one of the two longitudinal edges and having a biasing force tending to contract the at least one spring strip into a spiral, the at least one spring strip having an innermost spring edge and an outermost spring edge, and wherein the at least one spring strip is attached to one of the two longitudinal edges of the flexible material only from the outermost spring edge to a vertex of the at least one spring strip; and
at least one guide rail mountable to a vehicle roof adjacent the roof opening, the at least one guide rail guiding movement of the blind between an open position and a closed position relative to the roof opening.

16. The vehicle roof blind assembly according to claim 15 wherein the innermost spring edge faces a vehicle center and wherein the outermost spring edge is laterally spaced away from the innermost spring edge in a direction away from the vehicle center, the flexible material being attached to the at least one spring strip only from the outermost spring edge to the vertex such that the innermost spring edge is spaced apart from the flexible material.

17. The vehicle roof blind assembly according to claim 16 wherein the at least one spring strip has a curved cross-section defining the vertex between the innermost and outermost spring edges, and wherein an attachment interface between the at least one spring strip and the flexible material extends from the outermost spring edge to the vertex such that there is continuous direct contact between the at least one spring strip and the flexible material entirely from the outermost spring edge to the vertex.

* * * * *